Oct. 15, 1957 K. G. SCHWARZ ET AL 2,810,020

MAGNETIC HEAD FOR SOUND-RECORDING APPARATUS AND THE LIKE

Filed June 19, 1951

Inventors.
Karl Georg Schwarz, &
Hans-Christoph Wohlrab.
By [signature] Atty.

United States Patent Office 2,810,020

Patented Oct. 15, 1957

2,810,020

MAGNETIC HEAD FOR SOUND-RECORDING APPARATUS AND THE LIKE

Karl Georg Schwarz, Erlangen, and Hans-Christoph Wohlrab, Emmendingen, Baden, Germany, assignors to Klangfilm Gesellschaft mit beschrankter Haftung, Berlin and Karlsruhe, Germany, a German corporation Application June 19, 1951, Serial No. 232,368

Claims priority, application Germany August 12, 1950

9 Claims. (Cl. 179—100.2)

Figures 1, 2:
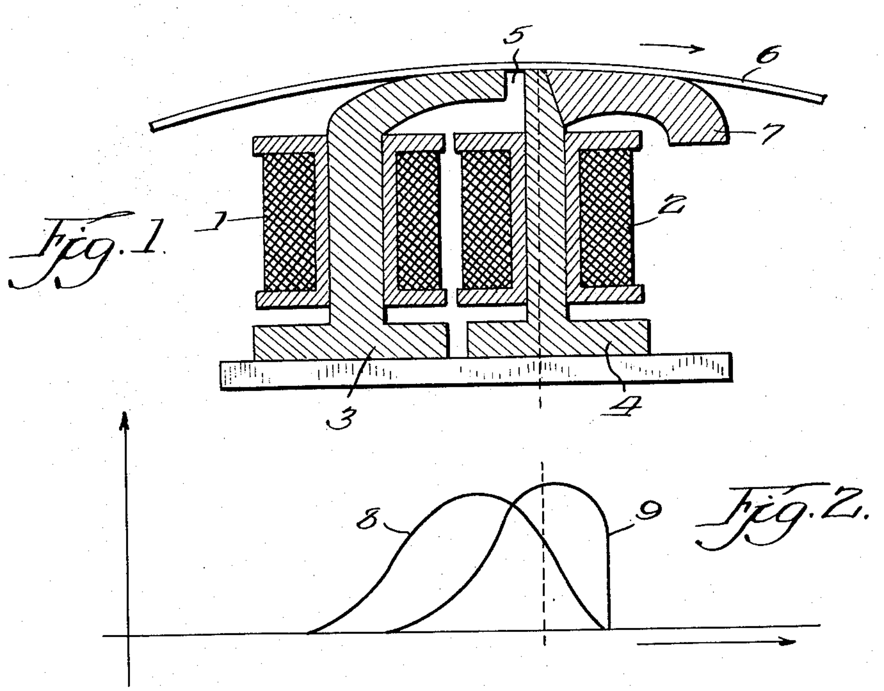

This invention relates to magnetic sound-recording apparatus and the like, e. g., tape recorders, and is particularly concerned with an electromagnetic transducer or magnetic head provided with means for superimposing a high-frequency magnetic field on the field produced by the oscillations to be recorded for the purpose of improving the operation and efficiency of the magnetic head. The practice heretofore provided a common winding for the transducer, e. g., the recording head and for connecting thereto the audio frequency which was to be recorded and also a high-frequency voltage. Accordingly, the high-frequency magnetic field becomes in such arrangement operative at the same point of the magnetic tape where the audio frequency field occurs, and the maxima and minima of both fields are directly superimposed.

Such an arrangement and operation has certain disadvantages which are, in accordance with the invention, eliminated by the provision on the transducer of two separate windings, and by energizing one of said windings only by the audio frequency which is to be recorded, while the other winding is energized only by the high-frequency oscillations, the arrangement being such that the high frequency field may be adjusted, shifted or displaced with respect to the low-frequency magnetic field for the purpose of obtaining the most advantageous operational effects.

The invention provides separate iron cores for the two windings and disposes the poles of these cores relative to one another in serially successive relationship, as seen in the direction of motion of the tape, preferably in such a manner that the pole excited by the high-frequency winding lies, as seen in the direction of the tape motion, ahead of the pole excited by the audio frequency winding. The high-frequency field thus affects the tape first.

The spacing of the poles and their shape are, in accordance with the invention, so arranged that the magnetic field which is produced by the audio frequency becomes effective upon the magnetic tape at a point where the high-frequency field decays. The audio frequency magnetic field therefore is substantially at a maximum at a point where the high-frequency magnetic field decreases. The result thereby obtained is a particularly favorable audio frequency magnetization exactly at the moment of demagnetization of the high-frequency field. A further object of the invention is to provide for a steep decay of the audio frequency field after such field has attained its highest value, so as to obtain clean-cut recording of the highest sound frequencies.

In order to obtain the foregoing advantages, the invention provides among others means for producing in back of the poles, or, rather to say, in back of the magnetic gap, a shielding of the magnetic lines of force. According to the invention, this means may comprise, e. g., a solid block of copper or a third pole of soft iron which is gradually increasingly spaced from the tape or progressively recedes therefrom.

Figure 3:
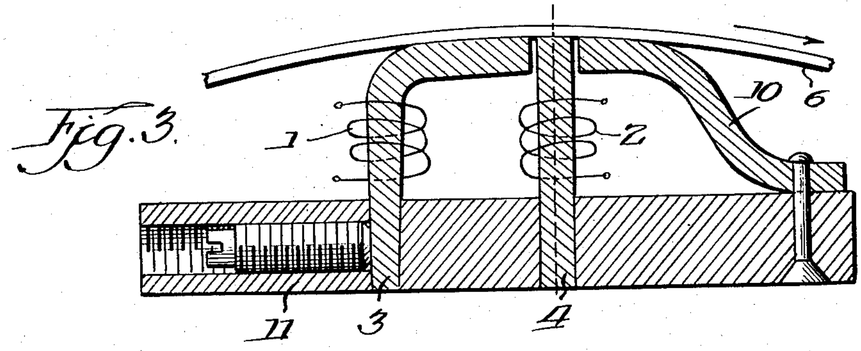
Figure 4:
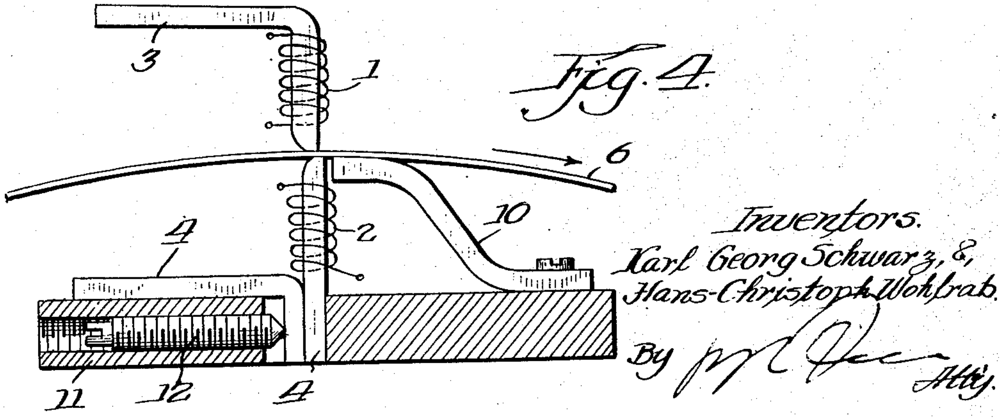

The objects indicated above and other objects and features will be brought out in the course of the detailed description which will presently be rendered with reference to the accompanying drawings. In these drawings, Fig. 1 shows an embodiment of a transducer in diagrammatic partially sectional representation;

Fig. 2 indicates examples of the curves of the high-frequency and audio frequency fields, respectively; and Figs. 3 and 4 illustrate modified transducers.

The transducer shown in Fig. 1 comprises the coils 1 and 2 disposed upon separate iron cores 3 and 4. The poles of these cores form a magnetic gap 5. This gap may either be an air gap of the known kind, or it may contain a nonmagnetizable material. For example, the poles may be brazed or soldered together by means of copper or brass. The magnetic sound carrier 6 may be a suitable tape or magnetic sound film or the like which moves in generally customary manner relative to the poles. The magnetically effective layer may in known manner consist of a layer of powdered iron or of a solid material. The coil 1, which is disposed as a lead coil, as viewed in the direction of the tape or film motion, is energized only by high frequency; and the serially successive coil 2 is energized by the low or audio frequency which is to be recorded. In back of the pole of the iron core 4 and coacting with the audio frequency coil 2 is disposed a solid copper block 7 which is preferably in direct engagement with the pole. This copper block has the dual function of shielding of the magnetic lines of force in back of the gap 5 and consequently causing a steep decay of the audio frequency field and of distorting the high frequency field more than the audio frequency field, thereby causing a relative supression of the high frequency field at the gap 5 so that the high frequency field becomes effective on the sound carrier 6 ahead of the audio frequency field.

From Fig. 2 may be seen the characteristics or curves of the high- and audio frequency fields, the relation of the curves to one another, as viewed in the direction of the tape motion, and their operative effect on the magnetic layer within the corresponding area of the tape. The tape 6 first moves through the gradually rising and then similarly steadily decaying high-frequency magnetic field 8. The audio frequency becomes effective with some delay and first rises gradually to a maximum value which is reached within the range of decay of the high-frequency field. The decay of the audio frequency field 9 takes place somewhat later, as compared with that of the high-frequency field 8, and is steeper due to the action of the shielding means, e. g., the copper block 7.

The field characteristics of the modified embodiment shown in Fig. 3 correspond substantially to those indicated in Fig. 2. The high-frequency coil is in Fig. 3 again indicated by numeral 1 and the audio frequency coil by numeral 2. Each has its individual iron core, as shown, respectively, at 3 and 4. For the shifting or displacement of the frequency fields there is provided an additional pole 10 forming with the pole 4 an additional gap which is displaced relative to the gap formed by the core 4 with the core 3. The additional pole 10 may be made of corresponding magnetizable material similar to the material used for the iron cores 3 and 4 and is arcuately formed to provide gradually increasing spacing from the tape 6. The iron cores 3, 4 and 10 forming the corresponding pole pieces are preferably mounted, e. g., by the use of bolts or by riveting, on the base plate 11 which may be made of nonmagnetizable material. The trailing end of the pole piece 10 is disposed upon the base 11 approximately in parallel with the tape 6 and preferably tapers to a point in the direction of the tape motion. The iron cores 3, 4, 10 are preferably made of relatively thin sheet iron, e. g., of transformer iron about 0.3 mm. thick, and are preferably single layer members, i. e., nonlaminated members. The pole pieces 3, 4, 10 are at the point of engagement with the tape suitably brazed together, as described in connection with Fig. 1, so as to produce very narrow magnetic gaps. The displacement of the high frequency field relative to the audio frequency field is thus obtained by the provision of two separate gaps which are displaced one relative to the other. The cores and associated windings or coils are so disposed that the high frequency and audio frequency become effective at two separate gaps.

In accordance with the invention, the arrangement may also be made, as indicated in Fig. 4. The frequency field shifting or displacement is obtained in this embodiment by the provision of a single gap for the audio frequency, which is formed by the poles 4 and 10 associated with the audio frequency coil 2. An additional pole 3 is provided carrying a coil 1 for the high frequency, such high frequency pole being displaced relative to the gap formed by the poles 4 and 10. More in detail, the pole 3 which is energized by the high-frequency coil 1, is disposed on one side of the magnetic tape 6 and is laterally displaced relative to the pole 4 which is disposed on the other side of the tape and energized by the audio frequency coil 2, the displacement being such, in the direction of the tape motion, that the high-frequency magnetic field becomes again operatively effective ahead of the audio frequency magnetic field. The pole 10 also serves as a shielding pole in order to produce the steep decay of the audio frequency field. The core 4 of this embodiment comprises two separate parts which are held together by suitable means, e. g., a screw 12. The arrangement facilitates the mounting of the audio frequency coil 2 in its proper position.

The transducer of the invention measures preferably only a few millimeters in length, width and height. The cross-sectional area of the iron cores 3, 4, 10 is accordingly very small so that operation takes place with relatively high magnetic induction in the iron.

The invention is of course not limited for use in sound-recording apparatus as such, but may be used to advantage in re-play, reproduction and similar devices, and also with apparatus of this general class, which operates with magnetic wire or like means instead of with tape or with film means. The corresponding terms employed herein should therefore be interpreted with sensible latitude so as to permit variations which are believed to be inherent in the invention.

Changes may be made within the scope and spirit of the appended claims.

We claim:

1. A magnetic head for magnetic tape recording apparatus and the like which operates with superposed high-frequency oscillations, comprising means forming respectively a distinct first core and a distinct and separate second core, each core forming adjacent the tape of said apparatus a distinct and separate pole piece for magnetic coaction with said tape, the pole piece formed by said first core being as viewed in the direction of motion of said tape disposed ahead of pole piece formed by said second core, a winding cooperating with each core, means for conducting to the winding cooperating with said first core high-frequency oscillations to energize said first core correspondingly so as to cause the pole piece formed thereby to impress said high-frequency oscillations upon said tape, means for separately conducting to the winding cooperating with said second core audio frequency oscillations to cause the pole piece formed by such second core to impress said audio frequency oscillations upon said tape, a third core member having a body forming adjacent said tape an additional pole piece, said body as viewed in the direction of motion of said tape gradually receding therefrom, said additional pole piece constituting magnetic shielding means which causes a steep decay of the audio frequency magnetic field impressed upon said tape by the pole piece formed by said second core.

2. An electromagnetic transducer for coaction with a magnetic tape and the like comprising separate first and second cores forming first and second pole pieces respectively associated therewith and disposed in closely spaced relation to form a gap therebetween, a coil carried by said first core for exciting it and the associated first pole piece with high frequency oscillations to generate a high frequency field which is effective to said tape, a coil carried by said second core for exciting it and the second pole piece associated therewith with audio frequency oscillations to generate an audio frequency field which is effective to said tape, and means for displacing the high frequency field relative to the audio frequency field responsive to the generation thereof by the excitation of said pole pieces.

3. An electromagnetic transducer for coaction with a magnetic tape and the like comprising separate first and second cores forming respectively first and second pole pieces associated therewith and disposed in closely spaced relation to form a gap therebetween, a coil carried by said first core for exciting it and the associated first pole piece with high frequency oscillations to generate a high frequency field which is effective to said tape, a coil carried by said second core for exciting it and the second pole piece associated therewith with audio frequency oscillations to generate an audio frequency field which is effective to said tape, and means for displacing the high frequency field relative to the audio frequency field responsive to the generation thereof by the excitation of said pole pieces to cause said high frequency field to become effective upon said tape ahead of said audio frequency field.

4. A transducer according to claim 3, comprising an eddy current generating member disposed adjacent one of said pole pieces, said member constituting said last named means.

5. A transducer according to claim 3, comprising a third core member forming a third pole piece which forms with said second pole piece a second gap, said high frequency field being effective across said first gap and said audio frequency field being effective across said second gap.

6. A transducer according to claim 3, wherein said audio frequency becomes effective with respect to said tape within an area of decay of said high frequency field.

7. A transducer according to claim 3, wherein said cores are disposed so that the pole pieces formed thereby face said tape from opposite sides.

8. A magnetic head according to claim 1, wherein said additional pole piece forms with the pole piece formed by said second core an additional gap for coaction with said tape.

9. A magnetic head according to claim 1, wherein said additional pole piece extends from said second core in intimate contact therewith.

References Cited in the file of this patent

UNITED STATES PATENTS

| | | |
|---|---|---|
| 2,536,030 | Camras | Jan. 2, 1951 |
| 2,587,593 | Camras | Mar. 4, 1952 |
| 2,628,285 | Camras | Feb. 10, 1953 |
| 2,675,429 | Rohling | Apr. 13, 1954 |

FOREIGN PATENTS

| | | |
|---|---|---|
| 880,550 | France | Jan. 10, 1953 |